United States Patent [19]

Pike

[11] Patent Number: 4,634,286

[45] Date of Patent: Jan. 6, 1987

[54] ELECTROGRAPHIC DEVELOPMENT APPARATUS HAVING A CONTINUOUS COIL RIBBON BLENDER

[75] Inventor: Susan C. Pike, Rochester, N.Y.

[73] Assignee: Eastman Kodak Company, Rochester, N.Y.

[21] Appl. No.: 773,282

[22] Filed: Sep. 6, 1985

[51] Int. Cl.[4] .......................... B01F 7/08; G03B 15/00

[52] U.S. Cl. .................................... 366/320; 118/657; 198/670; 198/676; 355/3 DD; 355/14 D; 366/323

[58] Field of Search ............... 366/320, 321, 279, 323, 366/318, 324, 319, 266, 89; 355/3 DD, 14 D, 3 R, 3 CH, 14 TR; 118/653, 657, 658; 198/661, 670, 676

[56] References Cited

U.S. PATENT DOCUMENTS

| | | | |
|---|---|---|---|
| 319,311 | 6/1885 | Peters . | |
| 560,259 | 5/1896 | Day et al. . | |
| 743,202 | 11/1903 | Speirs . | |
| 1,001,508 | 8/1911 | Craig . | |
| 1,457,848 | 6/1923 | Mojonnier . | |
| 1,861,721 | 6/1932 | Scott . | |
| 2,761,657 | 9/1956 | Rietz . | |
| 3,138,167 | 6/1964 | Fisher . | |
| 3,293,117 | 12/1966 | Pennington et al. . | |
| 3,315,947 | 4/1967 | Nauta | 366/320 |
| 3,639,051 | 2/1972 | Cherlap et al. . | |
| 3,664,299 | 5/1972 | Shaler . | |
| 3,675,904 | 7/1972 | Bremmer et al. . | |
| 3,724,725 | 4/1973 | Stauffer . | |
| 3,877,881 | 4/1975 | Ono . | |
| 3,912,388 | 10/1975 | Takahashi . | |
| 3,924,567 | 12/1975 | Koleman et al. . | |
| 3,943,887 | 3/1976 | Smith . | |
| 4,030,447 | 6/1977 | Takahashi et al. . | |
| 4,100,611 | 7/1978 | Jugle . | |
| 4,101,211 | 7/1978 | Kayson . | |
| 4,173,405 | 11/1979 | Swapceinski et al. . | |
| 4,194,465 | 3/1980 | Tsukamoto et al. . | |
| 4,201,484 | 5/1980 | Sasiela et al. . | |
| 4,235,194 | 11/1980 | Wada et al. . | |
| 4,286,544 | 9/1981 | Witte . | |
| 4,324,483 | 4/1982 | Tagawa . | |
| 4,344,692 | 8/1982 | Oda . | |
| 4,456,364 | 6/1984 | Hatzis | 355/3 DD |
| 4,546,060 | 10/1985 | Miskinis et al. . | |

OTHER PUBLICATIONS

Application Ser. No. 597,323, filed Apr. 6, 1984 (copy not enclosed).

"The Performance of Continuous Mixtures for Dry Powders", by C. F. Harwood et al., pp. 289–296.

"Update on Batch-Compounding Equipment", Part II: Low- and Medium-Intensity Batch Mixers, Plastics Compounding, Mar./Apr. 1981, (pp. 52, 53, 59, etc.).

"Which Mixer?" by J. B. Gray, Chemical Engineering Progress, Jan. 1957 (vol. 53, No. 1), pp. 25–J–32–J.

"Ribbon Blenders Working Capacities to 1000 Cubic ft.", Charles Ross & Son Company.

"Day Mixing (Mixing and Size Reduction Equipment", Style B Horizontal Batch Mixers, Sprout–Waldron, Bulletin 3460.

*Primary Examiner*—Robert W. Jenkins

*Attorney, Agent, or Firm*—G. Herman Childress

[57] ABSTRACT

An electrographic copier/duplicator has a development station with a sump for holding a supply of two-component developer material. A magnetic brush applies the developer material to a photoconductor moved past the magnetic brush. The developer material may comprise carriers of hard, magnetic material. A ribbon blender mixes the developer material in the sump. The blender includes first and second ribbons with each ribbon having a first, relatively large diameter helical end portion and a second relatively small diameter helical end portion. The second end portion of each ribbon is located substantially within the first end portion of the other ribbon. Because the two end portions of the ribbon are connected, there is good axial mixing of developer material in the area between the two portions of each ribbon, and the level of the developer material tends to remain level throughout the length of the ribbon blender. Replenishment of depleted toner particles can occur in the area between the first and second end portions of the ribbons.

5 Claims, 4 Drawing Figures

ELECTROGRAPHIC DEVELOPMENT APPARATUS HAVING A CONTINUOUS COIL RIBBON BLENDER

BACKGROUND OF THE INVENTION

This invention relates to development apparatus for an electrographic copier/duplicator or the like incorporating an improved ribbon blender for mixing developer material in such apparatus.

Electrographic development apparatus are well known in the art. Such apparatus may include a housing in which developer material is located and a magnetic brush that receives such material from the housing and transports it to a position where part of such material can be transferred to an electrostatic image formed on an insulating surface to thereby develop the image. The developer material may comprise a mixture of carrier particles and smaller toner particles. Some of the toner particles are transferred from the mixture to the electrostatic image during development of the image. Thus there is a need to replenish toner particles in used developer material in the housing. In order to replenish toner particles in used developer material, the used developer material can be delivered from the housing to an end sump along with the addition of fresh toner particles. The materials in the end sump are then mixed and agitated in order to thoroughly mix the fresh toner particles with the used developer material and to effect triboelectric charging of the materials. The resulting toner-replenished developer material is then transported from the end sump to the housing by means of augers or other apparatus so that the development material is again available for transfer of toner to a magnetic brush for development of an electrostatic image. An apparatus of this general type is disclosed in commonly assigned U.S. Pat. No. 4,101,211, issued July 18, 1978 in the name of Walter Kayson and entitled MAGNETIC CURTAIN SEAL FOR DEVELOPMENT APPARATUS. Such development apparatus requires relatively high circulation rates in order to transport toner replenished development material from the end sump along the entire length of the housing of the development station. Such high circulation rates increase power requirements for the development apparatus and decrease the developer life.

The carrier particles of a developer material may comprise permanent magnets. The carrier particles in such a material have a tendency to cling to each other to form clumps and, in general, in the absence of an external field, such materials have a tendency to behave somewhat like wet sand due to the magnetic direction attraction exerted between the particles. Such a material creates special problems in mixing developer material, circulating the material axially along a development station, agitating and shearing the developer to promote tribocharging and then feeding the developer to a magnetic brush. A material having carrier particles of permanent magnets is disclosed in the commonly assigned copending U.S. patent application Ser. No. 548,807, filed Nov. 4, 1983 in the names of E. T. Miskinis et al, and entitled TWO COMPONENT, DRY ELECTROGRAPHIC DEVELOPER COMPOSITIONS CONTAINING HARD MAGNETIC CARRIER PARTICLES AND METHODS FOR USING THE SAME.

Commonly assigned copending U.S. patent application Ser. No. 597,323, filed Apr. 6, 1984, in the names of Brian J. Joseph and Thomas K. Hilbert and entitled ELECTROGRAPHIC DEVELOPMENT APPARATUS HAVING A RIBBON BLENDER discloses a development station that is particularly adapted to handle developer materials having carrier particles that comprise permanent magnets such as disclosed in the before-mentioned copending U.S. patent application Ser. No. 548,807. In U.S. patent application Ser. No. 597,323, the development station of an electrographic copier/duplicator or the like has a sump for receiving a two-component developer material. A ribbon blender is located in the sump and comprises an outer helical ribbon and an inner helical ribbon both of which are concentrically located about the axis of a rotatable shaft. When the shaft is rotated, the ribbons move the developer material back and forth through the sump to agitate and shear the developer and promote tribocharging of the developer material. In one embodiment disclosed in that application, the inner and outer ribbons on one end portion of the shaft has a pitch that is opposite from the inner and outer ribbons on the other end portion of the shaft, and the inner ribbon on each end portion of the shaft has a pitch that is opposite from the outer ribbon on the same end portion of the shaft. When the shaft is rotated the outer ribbons drive the developer material toward the center portion of the ribbon blender and the inner ribbons drive the developer material toward the end portions of the ribbon blender.

While the ribbon blender of the before-mentioned application is suitable for mixing developer materials, including those with hard magnetic carrier particles, it has been found that some problems do occur when using such a ribbon blender. More specifically, axial mixing between the two end portions of the ribbon blender is not entirely satisfactory. In addition, the level of developer material across the length of the blender is not always even. Also, replenishment of toner depleted from the developer material during operation is achieved using a somewhat complex replenishment system.

SUMMARY OF THE INVENTION

An object of the present invention is to provide an improved ribbon blender for use in a development station of an electrographic copier/duplicator or the like which improves the axial mixing between the two end portions of the ribbon blender and wherein the material level across the length of the blender is more even than in the prior apparatus. Another object of the invention is to provide an improved system for replenishment of depleted toner materials.

In accordance with the present invention, an improved ribbon blender suitable for use in the development station of an electrographic copier/duplicator comprises a rotatable shaft. First and second continuous elongate ribbons are coiled around the shaft with each of the ribbons having first and second helical portions. The first helical portion of each ribbon is larger in diameter than the second helical portion, and the first ribbon has its second portion located within the first portion of the second ribbon. The second ribbon has its second portion located within the first portion of the first ribbon. Means are provided for supporting the ribbons on the shaft so that rotation of the shaft effects rotation of the ribbons.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
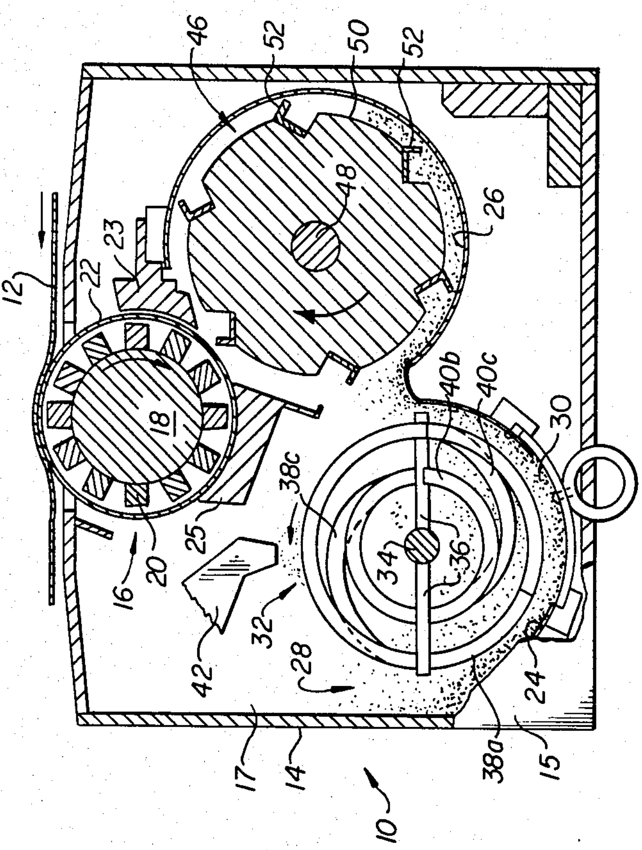
FIG. 1 is an end view of a preferred embodiment of development apparatus incorporating improvements of the present invention.

Referring now to FIG. 1 of the drawings, development apparatus of the present invention is generally designated 10 and is adapted to provide a supply of marking particles, such as toner, to an electrostatic image formed on a photoconductor 12 of electrographic copier/duplicator apparatus to develop the image. The photoconductor can be in the form of an endless web, or drum, or discrete sheets. The photoconductor is moved in the direction shown by the arrow in FIG. 1 along a path leading past the development apparatus 10 during operation of the electrographic apparatus. The image developed on the photoconductor can be fused to the photoconductor or can be transferred to a receiver sheet and fused on such sheet as is well known in the electrographic arts.

The development apparatus 10 has an elongate housing 14 with end walls 15 and 17. A magnetic brush 16 located in the upper portion of housing 14 extends substantially the entire length of the housing and is closely adjacent to the path of the photoconductor 12. The magnetic brush preferably comprises a core 18 and a series of permanent magnets 20 concentrically arranged around the core 18. The core and magnets are rotatable in a counterclockwise direction as viewed in FIG. 1 by a motor (not shown). Magnets 20 are arranged so that the poles at the outer portions thereof are alternately north and south poles. Concentric with the core 18 and magnets 20 is a cylindrical, non-magnetic shell 22. The shell can be stationary or it can be driven in a clockwise direction, for example. The magnets 20 attract magnetic developer material against the shell and rotation of the core brings such material into contact with the lower or insulating surface of the photoconductor 12 in a conventional manner.

A feed skive 23 has an edge adjacent to the surface of shell 22. Skive 23 limits the thickness of developer material carried to photoconductor 12 by the brush 16. A wiper 25 removes developer material from shell 22 after such material has been carried past the area of contact with the photoconductor.

Housing 14 has a first generally cylindrical recess 24 along one longitudinal side edge portion of the housing and a second generally cylindrical recess 26 adjacent to recess 24 and located slightly above the recess 24. Recess 24 and adjacent areas of the housing 14 define a sump 28 for developer material 30. Material 30 may have hard carrier particles of permanent magnetic material as disclosed in the before-mentioned U.S. patent application Ser. No. 548,807. Sump 28 extends substantially the full length of the housing 14 and eliminates the need for a separate end sump for mixing developer as required in some prior apparatus. Recesses 24, 26 extend substantially the entire distance from back wall 17 to a front wall 15 of the housing.

Figure 2A:
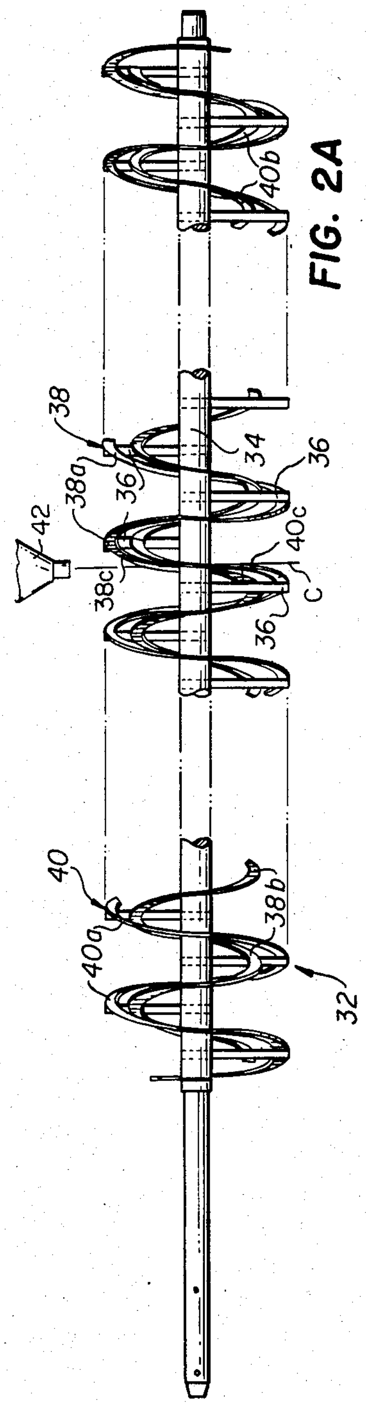
FIG. 2A is a fragmentary elevation view illustrating the improved ribbon blender of the FIG. 1 apparatus.
Figure 2B:
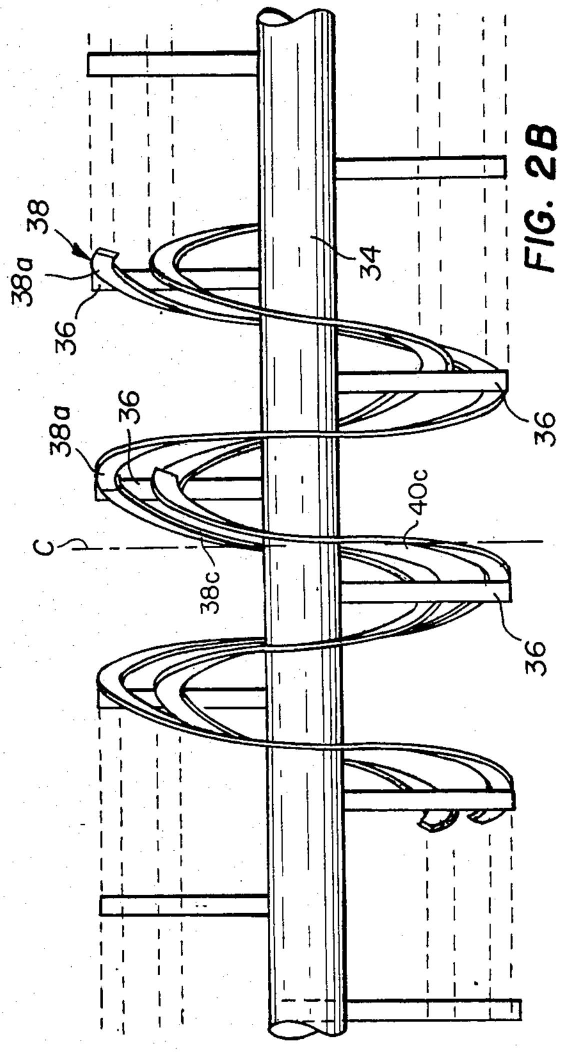
FIG. 2B is an enlarged view of the central portion of FIG. 2A.

Development apparatus as generally described above is disclosed in more detail in the before-mentioned co-pending U.S. patent application Ser. No. 597,323. In accordance with the present invention, an improved ribbon blender generally designated 32 is provided in sump 28. Referring now to FIGS. 1, 2A, and 2B, blender 32 is positioned in sump 28 with the lower portion thereof being generally adjacent but spaced from the cylindrical wall 24 of housing 14. The blender comprises a shaft 34 that is mounted within the housing for rotation about its axis in a generally counterclockwise direction as viewed in FIG. 1.

A plurality of rods 36 are secured to the shaft and project radially outwardly therefrom. Adjacent rods along the shaft are offset axially along the shaft as illustrated in FIGS. 2A and 2B. Alternate rods project at substantially 180-degrees with respect to each other.

The ribbon blender has a first ribbon generally designated 38 coiled around shaft 34. Ribbon 38 comprises a first helical end portion **38*a*, of relatively large diameter and a second helical end portion 38*b* of a relatively smaller diameter. Ribbon portions 38*a*, 38*b* are substantially the same length and have the same pitch. An imaginary plane C (FIGS. 2A and 2B) is between the two end portions and perpendicular to the axis of shaft 34. The transition area from the relatively large end portion 38*a* of ribbon 38 to the relatively small end portion 38*b* occurs along the portion of the ribbon indicated at 38*c* which spans plane C. It will be observed that both helical end portions of ribbon 38** are generally cylindrical and coiled in the same direction from one end of the ribbon to the other end of the ribbon.

In a similar manner, the ribbon blender comprises a second ribbon generally designated 40 having a first relatively large helical end portion **40*a* at the left end of the shaft as viewed in FIGS. 2A and 2B and a second relatively smaller helical end portion 40*b* at the right end portion of the shaft. Portions 40*a* and 40*b* are generally cylindrical, and portions 38*a*, 40*a* have the same diameter as do portions 38*b*, 40*b*. The transition portion 40*c* of ribbon 40 between the relatively large end portion 40*a* and the smaller end portion 40*b* spans plane C. The pitch of ribbon 40 is the same in both the relatively large portion 40*a* and the relatively smaller portion 40*b*, and the pitch of ribbon 40 is opposite to the pitch of ribbon 38. Thus, upon rotation of ribbon 40** both portions of the ribbon tend to move material from one end of the ribbon blender toward the other end of the ribbon blender.

Both of the ribbons 38, 40 are secured to the rods 36 located along shaft 34 so that the ribbons are in spaced relation to each other. The ribbons also are spaced from and coaxial with shaft 34. In addition, they are assembled so that the pitch of ribbon 38 is opposite to the pitch of ribbon 40. Thus upon rotation of shaft 34 one ribbon tends to move development material in the sump in a left to right direction as viewed in FIGS. 2A and 2B whereas the other ribbon tends to move the development material in the opposite direction.

During operation of development apparatus 10, some of the toner particles in the developer material 30 are transferred to a latent image on the photoconductor 12. Thus a fresh supply of toner particles needs to be provided to the sump 28 at least periodically in order to maintain the desired concentration of toner in the developer material. In accordance with the present invention, this can be accomplished by delivering a supply of toner through a conduit 42 from a supply bottle or container (not shown) of toner. Preferably the lower end of the conduit 42 is located with respect to plane C (FIGS. 2A, 2B and 3) so that fresh toner from the open end of the conduit is directed into the transition portions 38*c* and 40*c* of ribbons 38 and 40, respectively. This is desirable because toner particles deposited in this area will be immediately moved in both directions (left and right) from the center of the ribbons toward the ends thereof by ribbon portions 38*b*, 40*b* and thereby be quickly distributed throughout the sump. This minimizes gradients in toner concentration along the length of the ribbon blender and the development station generally.

Developer material from sump 28 can be provided to the magnetic brush 16 in any suitable way. By way of example, material can be transported from the sump to the brush by a feeding means generally designated 46 and comprising a shaft 48 having end plates 50 at its ends. The end plates carry a plurality of vanes 52 around the outer periphery so that when the shaft is rotated to drive the feed means 46 in a clockwise direction, the vanes pick up developer material from portion 26 of the housing and carry it into close proximity to the shell 22 of the magnetic brush. At that point the magnets 20 of the magnetic brush attract developer material toward the shell and advance it around the shell into contact with the photoconductor 12.

Figure 3:
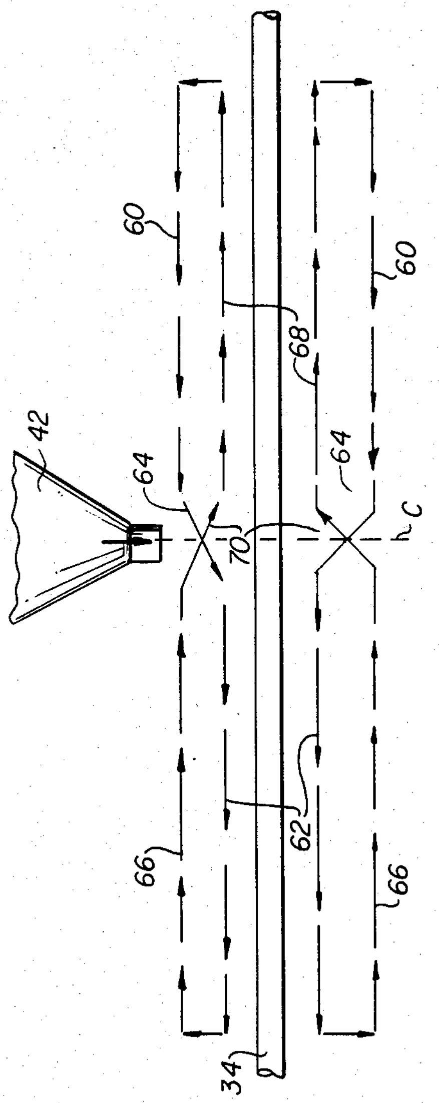
FIG. 3 is a view diagrammatically illustrating the flow of developer material in the development apparatus.

During operation, developer material 30 in sump 28 is agitated, sheared, and triboelectrically charged by operation of the ribbon blender 32. As shaft 34 of the blender is rotated in a counterclockwise direction (as viewed in FIG. 1), the outer helical portions 38*a* and 40*a* of ribbons 38 and 40 drive developer material from end portions of the blender toward the plane C at the center of the blender. Simultaneously, the relatively smaller helical portions 38*b* and 40*b* of the ribbons drive developer material from plane C at the center of the blender toward the end portions of the ribbon blender. This path of movement is best illustrated in FIG. 3 where an outer generally cylindrical body of developer material is shown at 60 being moved from the right end of the blender toward plane C, such representing the material moved by ribbon portion 38*a*. The right to left movement of developer material by ribbon 38 continues past plane C as indicated by a smaller generally cylindrical body of developer material shown at 62. The cylinder of material 62 comprises material moved by ribbon portion 38*b*. The transition between cylindrical portions 60 and 62 is shown at 64 and it comprises the material moved by the transition portion 38*c* of ribbon 38. Note that the portions 60, 62, 64 all extend in one direction, that is from the right end of the blender to the left end of the blender.

In a similar manner, ribbon 40 moves a cylindrical body of developer material as shown at 66 from the left end of the ribbon blender toward the plane C, and then the smaller helical portion 40*b* of the ribbon continues to move another smaller relatively large cylindrical body of developer material to the right as shown at 68. The transition area between the cylinders of material 66 and 68 is shown at 70 and represents the body of developer material moved by the center portion 40*c* of ribbon 40.

Fresh toner delivered through the outlet of conduit 42 falls through plane C and into the transition area of the ribbons represented in FIG. 3 by the lines 64 and 70. Fresh toner is delivered both to the left and the right from the center of the ribbon blender toward the ends thereof by ribbon portions 38*b*, 48*b* to rapidly replenish depleted toner material throughout the length of the sump.

A number of advantages are achieved by the present invention. First of all, axial mixing of developer material between the two end portions of the ribbon blender on opposite side of plane C is substantially improved. This results from the transition portions 38*c* and 40*c* of the two ribbons which smoothly and positively drive developer material from the outer cylinders of such material to the inner cylinders thereof during rotation of the blender. In addition, the improved mixing that occurs results in a substantially even level of developer material along the length of the ribbon blender and thereby assures even flow of the developer material to the feed means 46 and then to the magnetic brush 16. Moreover, location of the outlet of conduit 42 with respect to plane C the transition area of the ribbons, improves replenishment of the toner and reduces the time needed for the toner to move throughout the length of the station. Replenishment of toner at the center of the blender is an attractive alternative not only because it is simpler and therefore less expensive than some other replenishment systems, but also because material deposited at the center of this blender is pushed axially into the developer mixture. If the toner simply dropped along the full length of the ribbon blender there is a chance that some of the toner might be delivered directly to the vanes 52 for transport to the magnetic brush before such particles are thoroughly mixed and triboelectrically charged.

The invention has been described in detail with particular reference to a preferred embodiment thereof, but it will be understood that variations and modifications can be effected within the spirit and the scope of the invention as described hereinabove and defined in the appended claims.

I claim:

1. In development apparatus having a sump for developer material comprising hard magnetic carrier particles and toner particles, a ribbon blender for mixing developer material in the sump, and means for transporting developer material from the sump to a latent image on a photoconductor, an improved ribbon blender comprising:

a rotatable shaft, first and second continuous elongate ribbons coiled around the shaft, each of the ribbons having first and second generally cylindrical helical portions with the first helical portion being larger in diameter than the second helical portion, the first ribbon having its second portion located within the first portion of the second ribbon, the second ribbon having its second portion located within the first portion of the first ribbon, and means for supporting the ribbons from the shaft so that rotation of the shaft effects rotation of the ribbons.

2. The invention as set forth in claim 1 wherein an area of transition from the first portion to the second portion of each ribbon is substantially at the center of the ribbons, and further comprising means for replenishing toner in the sump, the toner replenishing means comprising means for delivering substantially all of the toner to the transition area for distribution throughout the length of the sump by the ribbons.

3. In development apparatus for an electrographic copier/duplicator comprising a sump for holding a supply of developer material, and a magnetic brush for applying developer material to a photoconductor, the improvement comprising:

a ribbon blender for mixing developer material in the sump, the blender comprising first and second ribbons with each ribbon having a first helical end portion and a second helical end portion, the second end portion of each ribbon being smaller than the first end portion and being located substantially within the first end portion of the other ribbon, the ribbons each having a transition portion interconnecting the end portions thereof, and means for rotating the ribbons within the sump so that (1) the first end portions of the ribbons drive developer material from ends of the blender toward the center thereof, (2) the second end portions of the ribbons drive developer material toward the ends of the blender, and (3) the transition portions of the ribbons drive developer material through the center portion of the blender.

4. Apparatus as set forth in claim 3 wherein the pitch of the first ribbon is the same in both end portions and the pitch of the second ribbon is the same in both end portions, the pitch of the first ribbon being opposite from the pitch in the second ribbon.

5. Apparatus as set forth in claim 3 further comprising means for replenishing toner in the sump comprising a conduit for feeding toner into the blender with substantially all of such toner being directed into the transition portion of the ribbons.

* * * * *